US012633217B2

(12) United States Patent
Kohara et al.

(10) Patent No.: US 12,633,217 B2
(45) Date of Patent: May 19, 2026

(54) CONTROL DEVICE, CONTROL METHOD, AND NON-TRANSITORY STORAGE MEDIUM

(71) Applicants: TOYOTA JIDOSHA KABUSHIKI KAISHA, Aichi (JP); CONTINENTAL AUTONOMOUS MOBILITY GERMANY GMBH, Ingolstadt (DE)

(72) Inventors: Takahiro Kohara, Toyota (JP); Tomohiko Mochizuki, Okazaki (JP); Takayoshi Nohara, Toyota (JP); Masahiro Takahashi, Toyota (JP); Yuki Hashimoto, Yokohama (JP)

(73) Assignees: TOYOTA JIDOSHA KABUSHIKI KAISHA, Aichi-Ken (JP); CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 35 days.

(21) Appl. No.: 18/724,609

(22) PCT Filed: Sep. 22, 2023

(86) PCT No.: PCT/EP2023/076292

§ 371 (c)(1), (2) Date: Jun. 27, 2024

(87) PCT Pub. No.: WO2024/078848

PCT Pub. Date: Apr. 18, 2024

(65) Prior Publication Data

US 2025/0078659 A1 Mar. 6, 2025

(30) Foreign Application Priority Data

Oct. 12, 2022 (JP) ................................. 2022-164179

(51) Int. Cl.
*G08G 1/16* (2006.01)
*G08G 1/0962* (2006.01)

(52) U.S. Cl.
CPC ............. *G08G 1/16* (2013.01); *G08G 1/0962* (2013.01)

(58) Field of Classification Search
CPC ........ G08G 1/16; G08G 1/0962; G08G 1/167; B60K 2360/178; B60K 2360/179;
(Continued)

(56) References Cited

U.S. PATENT DOCUMENTS 7,348,876 B2 * 3/2008 Kato ........................ B60Q 1/22 701/300
2019/0071073 A1 3/2019 Yamashita
(Continued)

FOREIGN PATENT DOCUMENTS

JP 2005-219712 A 8/2005
JP 2017-129980 A 7/2017
(Continued)

*Primary Examiner* — Daryl C Pope
(74) *Attorney, Agent, or Firm* — HAUPTMAN HAM, LLP

(57) ABSTRACT

A control device include a memory and a processor coupled to the memory. The processor is configured to acquire state information related to an approach state toward a driver's vehicle of another vehicle approaching the driver's vehicle from behind, and based on the acquired state information, prohibit notification by a notification section in a case in which a notification condition has been established for notifying an approach of the other vehicle toward the driver's vehicle to an occupant of the driver's vehicle through the notification section and also the other vehicle is the same as a vehicle notified as approaching toward the driver's vehicle immediately previously.

16 Claims, 5 Drawing Sheets

(58) Field of Classification Search
CPC .... B60K 2360/48; B60K 35/21; B60K 35/23; B60K 35/265; G01S 2013/93272; G01S 13/931; G06V 20/58
See application file for complete search history.

(56) References Cited

U.S. PATENT DOCUMENTS

| | | | | |
|---|---|---|---|---|
| 2021/0197846 | A1* | 7/2021 | Thakur .................. | B60Q 1/545 |
| 2021/0269055 | A1 | 9/2021 | Kokido et al. | |

FOREIGN PATENT DOCUMENTS

| | | | |
|---|---|---|---|
| JP | 2019046170 | A | 3/2019 |
| WO | 2019220582 | A1 | 11/2019 |

* cited by examiner

CONTROL DEVICE, CONTROL METHOD, AND NON-TRANSITORY STORAGE MEDIUM

RELATED APPLICATIONS

The present application is a National Phase of International Application No. PCT/EP2023/076292 filed Sep. 22, 2023, which claims priority to Japanese Application No. 2022-164179 filed Oct. 12, 2022.

TECHNICAL FIELD

The present disclosure relates to a control device, a control method, and a non-transitory storage medium.

BACKGROUND ART

For example, Japanese Patent Application Laid-Open (JP-A) No. 2017-129980 discloses technology capable of notifying a driver about an approaching following vehicle in an appropriate manner.

SUMMARY OF THE INVENTION

Technical Problem

In the technology disclosed in JP-A No. 2017-129980, when after notification to a driver the following vehicle has moved away from a driver's vehicle, there is a concern that when notification is subsequently performed when the following vehicle again approaches the driver's vehicle, the driver would feel pressured by such notification.

The present disclosure provides a control device, a control method, and a non-transitory storage medium capable of notifying a driver's vehicle occupant of an approach of another vehicle toward the driver's vehicle, while also reducing the occupant from feeling pressured.

Solution to the Problem

A control device of a first aspect includes an acquisition section that acquires state information related to an approach state toward a driver's vehicle of another vehicle approaching the driver's vehicle from behind, and a control section that, based on the acquired state information, prohibits notification by a notification section in a case in which a notification condition has been established for notifying an approach of the other vehicle toward the driver's vehicle to an occupant of the driver's vehicle through the notification section and also the other vehicle is the same as a vehicle notified as approaching toward the driver's vehicle immediately previously.

In the control device of the first aspect, the acquisition section acquires the state information. Based on the state information acquired by the acquisition section, the control section, the control section prohibits notification by the notification section in a case in which the notification condition has been established and also the other vehicle approaching toward the driver's vehicle is the same as the vehicle notified immediately previously. This thereby enables the control device to notify the driver's vehicle occupant of the approach of the other vehicle toward the driver's vehicle, while also reducing the occupant from feeling pressured.

A control device of a second aspect is the first aspect, wherein the notification condition includes a first notification condition and a second notification condition, and the control section causes execution of notification by the notification section in a case in which one of the first notification condition or the second notification condition has been established while there is no establishment history for both the first notification condition and the second notification condition, or in a case in which, while executing notification accompanying establishment of one of the first notification condition or the second notification condition, the other of the first notification condition or the second notification condition for which there is no establishment history becomes established.

In the control device of the second aspect, the notification condition includes the first notification condition and the second notification condition. The control section causes execution of notification by the notification section when one of the first notification condition or the second notification condition is established in a case in which there is no establishment history for both the first notification condition and the second notification condition. Moreover, the control section causes execution of notification by the notification section in a case in which, while executing notification accompanying establishment of one of the first notification condition or the second notification condition, the other of the first notification condition or the second notification condition for which there is no establishment history becomes established. The control device is thereby able to decide whether or not to cause execution of notification by the notification section based on a history of the establishment of each of the notification conditions.

A control device of a third aspect is the second aspect, wherein the control section determines that the first notification condition has been established in a case in which the other vehicle has approached as far as a specific region behind the driver's vehicle; and determines that the second notification condition has been established in a case in which a relative collision time resulting from dividing a distance between the driver's vehicle and the other vehicle by a relative speed between the driver's vehicle and the other vehicle is a specific value or lower.

In the control device of the third aspect, the control section determines that the first notification condition has been established in a case in which the other vehicle has approached as far as the specific region behind the driver's vehicle. The control section determines that the second notification condition has been established in a case in which the relative collision time resulting from dividing the distance between the driver's vehicle and the other vehicle by the relative speed therebetween is the specific value or lower. Thereby the control device is able to decide the establishment of each of the notification conditions in a case in which a possibility of the other vehicle colliding with the driver's vehicle has risen.

A control device of a fourth aspect is the first aspect wherein the control section determines that the notification condition has been established in a case in which an approach state of the other vehicle toward the driver's vehicle is a specific state and also a vehicle speed of the driver's vehicle is a specific value or greater.

In the control device of the fourth aspect, the control section determines that the notification condition has been established in a case in which the approach state of the other vehicle toward the driver's vehicle is the specific state and also the vehicle speed of the driver's vehicle is the specific value or greater. The control device is thereby able to prevent notification being executed on a road where the vehicle speed of the driver's vehicle is less than the specific value such as, for example, on an ordinary road.

A control device of a fifth aspect is the fourth aspect wherein, in a case in which the vehicle speed becomes the specific value or greater after the approach state of the other vehicle toward the driver's vehicle becomes the specific state, the control section determines that the notification condition has been established at a timing when the vehicle speed becomes the specific value or greater, and in a case in which the vehicle speed has then become less than the specific value after the approach state of the other vehicle toward the driver's vehicle is the specific state and the vehicle speed previously became the specific value or greater, the control section determines that the notification condition is not established at a timing at which the vehicle speed became less than the specific value.

In the control device of the fifth aspect, the control section determines that the notification condition has been established at the timing when the vehicle speed becomes the specific value or greater in a case in which the vehicle speed becomes the specific value or greater after the approach state of the other vehicle toward the driver's vehicle becomes the specific state. The control section also determines that the notification condition is not established at a timing at which the vehicle speed became less than the specific value in a case in which the vehicle speed has then become less than the specific value after the approach state of the other vehicle toward the driver's vehicle is the specific state and the vehicle speed previously became the specific value or greater. The control device is thereby able to decide the establishment or non-establishment of the notification condition based on the approach state of the other vehicle toward the driver's vehicle and on the vehicle speed of the driver's vehicle.

As described above, the control device according to the present disclosure is able to notify an driver's vehicle occupant of an approach of another vehicle toward the driver's vehicle, while also reducing the occupant from feeling pressured.

DESCRIPTION OF THE EMBODIMENTS

First Exemplary Embodiment

Figure 1:
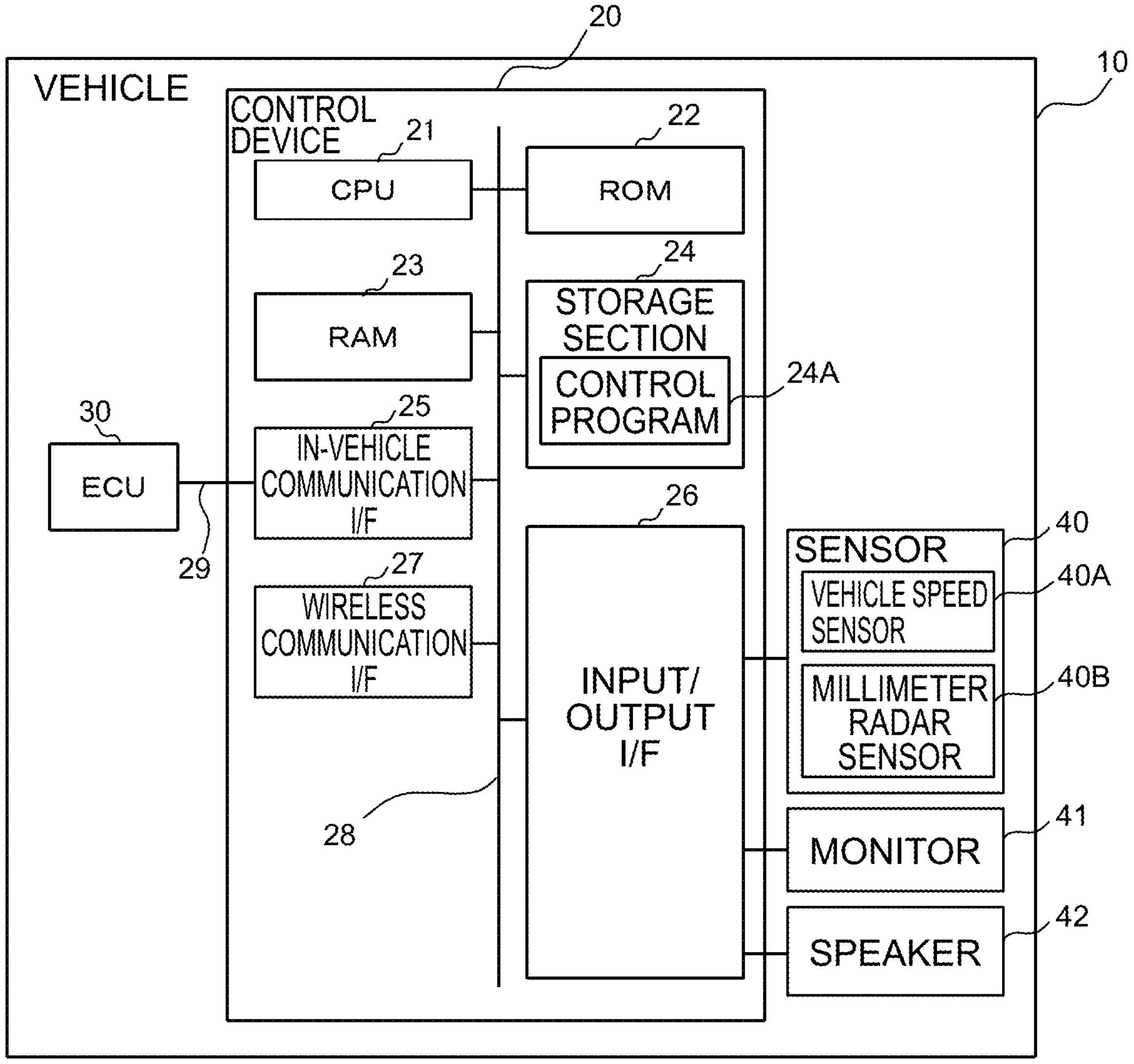
FIG. 1 is a block diagram illustrating a hardware configuration of a vehicle.

First description follows regarding a first exemplary embodiment of a vehicle 10 according to the present exemplary embodiment. FIG. 1 is a block diagram illustrating a hardware configuration of the vehicle 10. The vehicle 10 is an example of a "driver's vehicle".

As illustrated in FIG. 1, the vehicle 10 is configured including a vehicle 10, a control device 20, an electronic control unit (ECU) 30, a sensor 40, a monitor 41, and a speaker 42.

The control device 20 is configured including a central processing unit (CPU) 21, read only memory (ROM) 22, random access memory (RAM) 23, a storage section 24, an in-vehicle communication interface (I/F) 25, an input/output I/F 26, and a wireless communication I/F 27. The CPU 21, the ROM 22, the RAM 23, the storage section 24, the in-vehicle communication I/F 25, the input/output I/F 26, and the wireless communication I/F 27 are connected together through an internal bus 28 so as to be able to communicate with each other.

The CPU 21 is a central processing unit that executes various programs, and controls each section. Namely, the CPU 21 serves as a processor, reads a program from the ROM 22 serving as a memory or the storage section 24 serving as a memory, and executes the program using the RAM 23 as a workspace. The CPU 21 controls each configuration and performs various computational processing according to the program stored on the ROM 22 or the storage section 24.

The ROM 22 stores various programs and various data. The RAM 23 serves as a workspace to temporarily store programs or data.

The storage section 24 is configured from a storage device, such as an embedded Multi Media Card (e-MMC) or Universal Flash Storage (UFS), and is stored with various programs and various data. The storage section 24 is stored with a control program 24A to cause decision processing, described later, to be executed in the CPU 21.

The in-vehicle communication I/F 25 is an interface for connecting to the ECU 30. This interface employs a communication standard such as a CAN protocol. The in-vehicle communication I/F 25 is connected to an external bus 29. Note that although omitted in the drawings, the ECU 30 is provided for each of the plural functions of the vehicle 10.

The input/output I/F 26 is an interface for communication with the sensor 40, the monitor 41, and the speaker 42 installed to the vehicle 10.

The sensor 40 is a detection device for detecting a state of the vehicle 10 and a state outside the vehicle 10. The sensor 40 includes, as an example, a vehicle speed sensor 40A and a millimeter radar sensor 40B.

The vehicle speed sensor 40A is a sensor for detecting the vehicle speed of the vehicle 10 and is, for example, provided to a vehicle wheel. The millimeter radar sensor 40B is a sensor for detecting a following vehicle approaching the vehicle 10 from behind, and is at least provided to a rear section of the vehicle 10. The millimeter radar sensor 40B is employed to detect a following vehicle by transmitting transmission waves rearward of the vehicle 10 and receiving waves reflected from objects behind. The following vehicle is an example of "another vehicle".

The monitor 41 is provided to an instrument panel, to a meter panel, or the like, and is a liquid crystal monitor for displaying proposed actions related to the functions of the vehicle 10, images related to explanation of such functions, or the like. The monitor 41 may be provided by a touch panel that also performs an input function.

The speaker 42 is provided to the instrument panel, the center console, the front pillar, the dashboard, or the like, and is a device for outputting proposed actions related to the functions of the vehicle 10, speech related to explanation of such functions, or the like. The monitor 41 and the speaker 42 are an example of a "notification section".

The wireless communication I/F 27 is a wireless communication module for communication with external devices.

This wireless communication module employs, for example, a communication standard such as 5G, LTE, or Wi-Fi (registered trademark).

Figure 2:
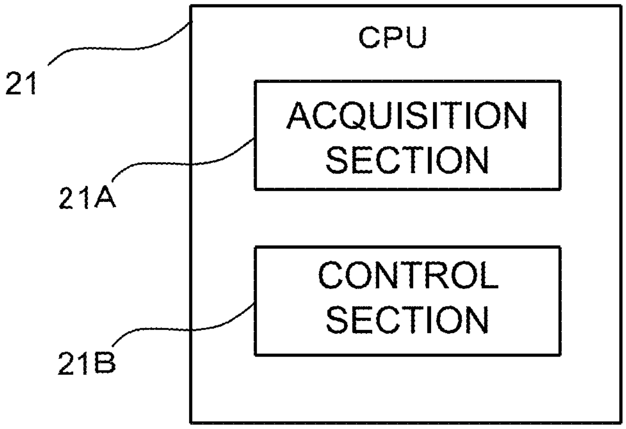
FIG. 2 is a block diagram illustrating an example of a functional configuration of a control device.

Next, description follows regarding a functional configuration of the control device 20. FIG. 2 is a block diagram illustrating an example of a functional configuration of the control device 20.

As illustrated in FIG. 2, the CPU 21 of the control device 20 includes, from a functional perspective, an acquisition section 21A and a control section 21B. Each functional configuration is implemented by the CPU 21 reading and executing the control program 24A stored on the storage section 24.

The acquisition section 21A acquires state information related to an approach state toward the vehicle 10 of a following vehicle approaching the vehicle 10 from behind. As an example, the acquisition section 21A acquires a detection result of the millimeter radar sensor 40B as the state information.

Based on the state information acquired by the acquisition section 21A, the control section 21B decides whether or not of a notification condition has been established for notifying an occupant of the vehicle 10 through the monitor 41 and the speaker 42 of an approach of the following vehicle toward the vehicle 10. In the first exemplary embodiment, the control section 21B determines that the notification condition is established in a case in which the following vehicle has approached as far as a specific region behind the vehicle 10. For example, the control section 21B employs the detection result of the millimeter radar sensor 40B as an inter-vehicle distance between the vehicle 10 and the following vehicle, and performs decision processing as to whether or not the following vehicle has approached as far as the specific region behind the vehicle 10. The control section 21B then determines that the notification condition has been established or not established according to the decision as to whether or not the following vehicle has approached as far as the specific region behind the vehicle 10.

The control section 21B then, based on the state information acquired by the acquisition section 21A, identifies the following vehicle. For example, based on the detection result of the millimeter radar sensor 40B, the control section 21B periodically executes identification processing of a movement track of a following vehicle traveling directly behind the vehicle 10 or of object detection or the like. The control section 21B then identifies an identity of the following vehicle based on a similarity between feature values of a result of a given identification processing and a result of identification processing executed immediately previously to the given identification processing.

The control section 21B then, based on the state information acquired by the acquisition section 21A, causes execution of notification by the monitor 41 and the speaker 42 in a case in which the notification condition is established and also the following vehicle as identified is different to the vehicle whose approach to the vehicle 10 was notified immediately previously (hereafter referred to as "immediately previous vehicle"). In such cases, the monitor 41 displays a specific image and the speaker 42 outputs specific speech as the notification.

Moreover, based on the state information acquired by the acquisition section 21A, the control section 21B prohibits notification by the monitor 41 and the speaker 42 in a case in which the notification condition is established and also the following vehicle as identified is the same as the immediately previous vehicle. Namely, in such cases the notification by the monitor 41 and the speaker 42 is not executed.

Figure 3:
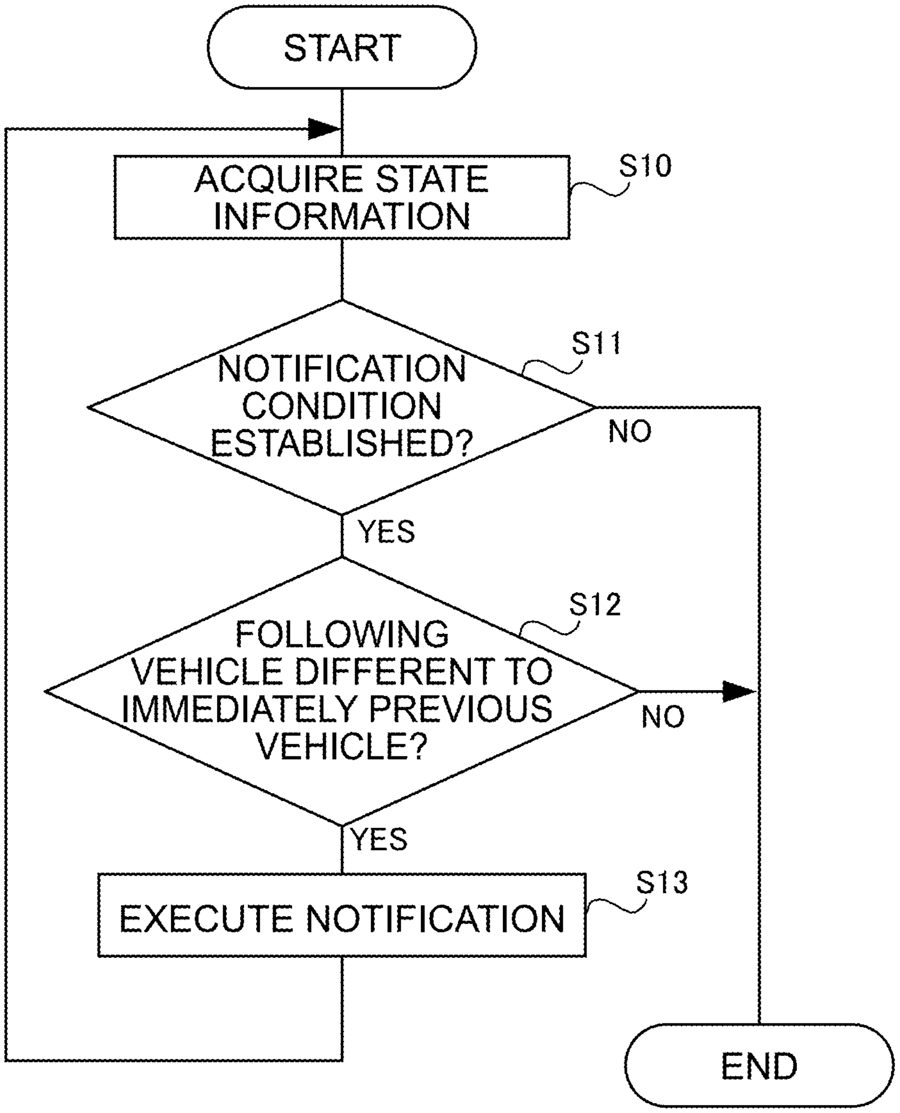
FIG. 3 is a first flowchart illustrating a flow of decision processing.

FIG. 3 is a first flowchart illustrating a flow of decision processing by the control device 20 to decide whether or not to notify an occupant of an approach of the following vehicle toward the vehicle 10. The CPU 21 performs the decision processing by reading the control program 24A from the storage section 24 and expanding and executing the control program 24A in the RAM 23.

At step S10 of FIG. 3, the CPU 21 acquires the state information. The CPU 21 then proceeds to step S11.

At step S11, the CPU 21 determines whether or not the notification condition has been established based on the state information acquired at step S10, and proceeds to step S12 in a case in which determination is that the notification condition has been established (step S11: YES). However, the CPU 21 ends the decision processing in a case in which determination is not made that the notification condition is established (step S11: NO).

At step S12, based on the state information acquired at step S10, the CPU 21 determines whether or not the following vehicle is different to the immediately previous vehicle, and proceeds to step S13 in a case in which the following vehicle is determined to be different to the immediately previous vehicle (step S12: YES). However, the CPU 21 ends the decision processing in a case in which the following vehicle is determined to not be different to the immediately previous vehicle (step S12: NO).

At step S13, the CPU 21 causes the monitor 41 and the speaker 42 to execute notification. The CPU 21 then returns to step S10.

As described above, in the control device 20 according to the first exemplary embodiment, the CPU 21 acquires the state information. The CPU 21 then, based on the acquired state information, prohibits notification by the monitor 41 and the speaker 42 in a case in which the notification condition is established and also the following vehicle is the same as the immediately previous vehicle. Thereby the control device 20 is able to notify the occupant of the approach of the following vehicle toward the vehicle 10 while also reducing the occupant of the vehicle 10 from feeling pressured.

In the vehicle 10 described above, manual driving control is performed as driving control so as to travel based on driving operations by an occupant (driver). However, there is no limitation thereto, and the vehicle 10 may by a vehicle (a so-called autonomous vehicle) in which automated driving control is performed as the driving control, such as automatically performed acceleration and deceleration, braking, steering, and the like, and that travels under this automated driving control. In such cases, even while the vehicle 10 that is an autonomous vehicle is performing the automated driving control, the control device 20 as described above is able to notify the occupant of the approach of the following vehicle toward the vehicle 10 while also reducing the occupant from feeling pressured.

Second Exemplary Embodiment

Next, description follows regarding a second exemplary embodiment of the vehicle 10 according to the present exemplary embodiments, with duplicate explanation of parts thereof common to the above exemplary embodiment either abbreviated or omitted.

In the second exemplary embodiment, the notification condition includes a first notification condition and a second notification condition. The control section 21B determines that the first notification condition has been established in a case in which the following vehicle has approached as far as the specific region behind the vehicle 10. The control section 21B also determines that the second notification condition has been established in a case in which a so-called time to collision (TTC), which is a relative collision time resulting from dividing a distance between the vehicle 10 and the following vehicle by the relative speed therebetween, becomes a specific value or less. For example, the control section 21B employs the detection results of the millimeter radar sensor 40B as an inter-vehicle distance between the vehicle 10 and the following vehicle and as the relative speed thereof to compute the TTC between the vehicle 10 and the following vehicle. Note that when each notification condition has been established, the control section 21B associates the established notification condition with the corresponding following vehicle, and stores a history of established notification conditions (hereafter referred to as "establishment history") in the storage section 24.

In a case in which any of the notification conditions has been established, then based on the establishment history stored in the storage section 24, the control section 21B performs history determination as to whether or not to notify the occupant of the approach of the following vehicle toward the vehicle 10. More specifically, in a case in which one of the first notification condition or the second notification condition has been established, the control section 21B gives the determination of "OK" as history determination when there is no establishment history for both the first notification condition and the second notification condition. Moreover, the control section 21B gives the determination of "OK" as history determination in a case in which there is no establishment history for one established notification condition and notification is being executed accompanying establishment of the other notification condition. Note that the control section 21B gives the determination of "NOT OK" as history determination except in the two cases described above.

Then the control section 21B gives the determination "OK" as the above history determination and also causes execution of notification by the monitor 41 and the speaker 42 in a case in which the following vehicle as identified is different to the immediately previous vehicle.

Figure 4:
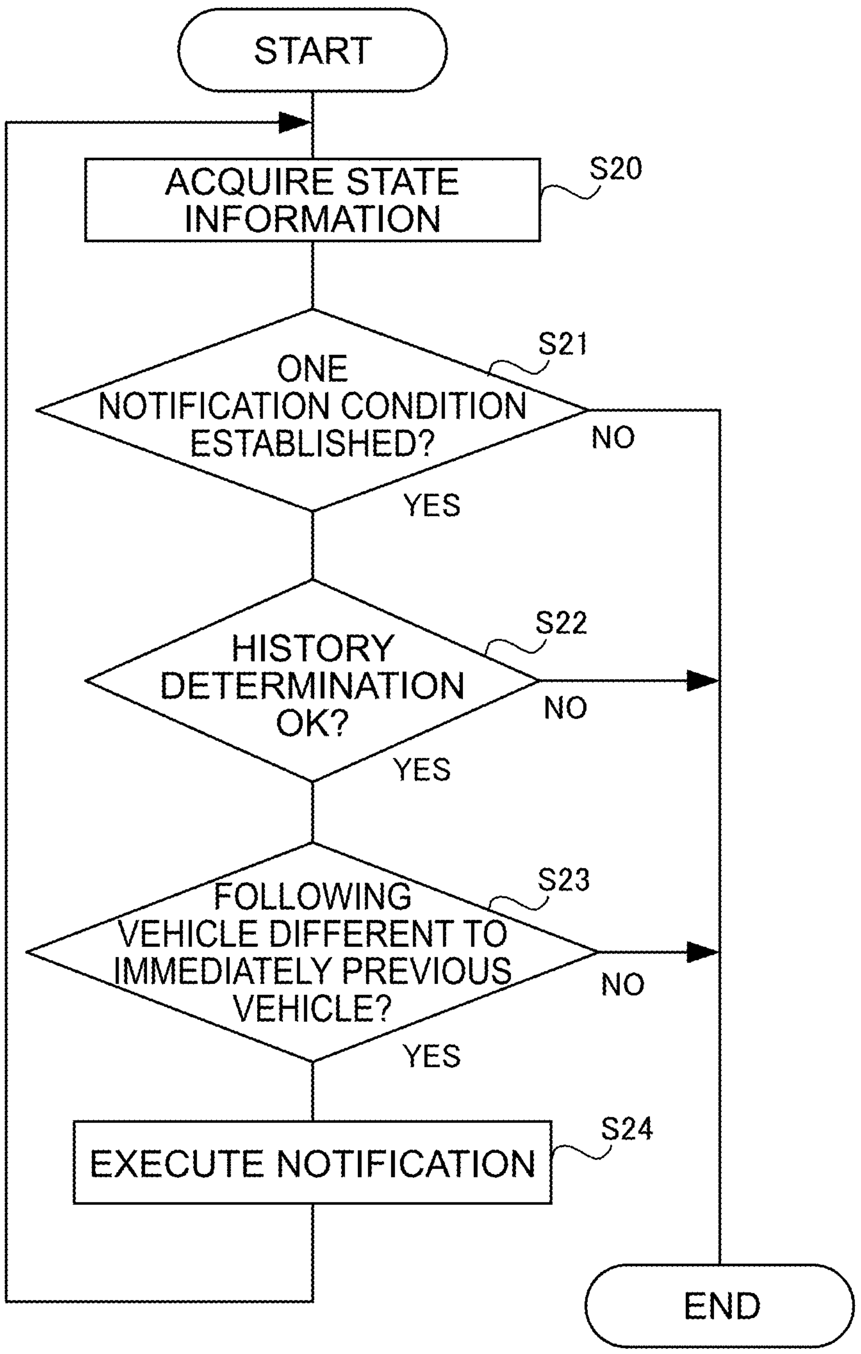
FIG. 4 is a second flowchart illustrating a flow of decision processing.

Next description follows regarding a flow of decision processing in the second exemplary embodiment. FIG. 4 is a second flowchart illustrating a flow of decision processing.

At step S20 illustrated in FIG. 4, the CPU 21 acquires state information. The CPU 21 then proceeds to step S21.

At step S21, based on the state information acquired at step S20, the CPU 21 determines whether or not any notification condition, more specifically at least one of the first notification condition or the second notification condition, has been established, and proceeds to step S22 in a case in which determination is that a notification condition has been established (step S21: YES). The CPU 21 ends the decision processing when not determined that at least one of the first notification condition or the second notification condition is established (step S21: NO).

At step S22, the CPU 21 performs history determination based on the establishment history stored in the storage section 24, and proceeds to step S23 in a case in which an "OK" determination was given in the history determination (step S22: YES). The CPU 21 ends the decision processing in a case in which "OK" determination was not given in the history determination (step S22: NO).

At step S23, based on the state information acquired at step S20, the CPU 21 determines whether or not the following vehicle is different to the immediately previous vehicle, and proceeds to step S24 in a case in which the following vehicle is determined to be different to the immediately previous vehicle ((step S23: YES). The CPU 21 ends the decision processing in a case in which the following vehicle is not determined to be different to the immediately previous vehicle (step S23: NO).

At step S24 the CPU 21 causes execution of notification by the monitor 41 and the speaker 42. The CPU 21 then returns to step S20.

As described above, in the control device 20 according to the second exemplary embodiment the notification condition includes the first notification condition and the second notification condition. The CPU 21 causes execution of notification by the monitor 41 and the speaker 42 in a case in which one of the first notification condition or the second notification condition has been established in a case in which there is no establishment history for both the first notification condition and the second notification condition and also the following vehicle as identified is different to the immediately previous vehicle. Moreover, the CPU 21 cause execution of notification by the monitor 41 and the speaker 42 in a case in which, during execution of notification accompanying establishment of one of the first notification condition or the second notification condition, the other of the first notification condition or the second notification condition for which there is no establishment history becomes established and also the following vehicle as identified is different to the immediately previous vehicle. This thereby enables whether or not to cause execution of notification by the monitor 41 and the speaker 42 to be decided in the control device 20 based on a history of establishment for each notification condition.

In the control device 20 the CPU 21 also determines that the first notification condition has been established in a case in which the following vehicle has approached as far as the specific region behind the vehicle 10. The CPU 21 also determines that the second notification condition has been established in a case in which the TTC between the vehicle 10 and the following vehicle is the specific value or lower. This thereby enables determination that each notification condition has been established to be made in the control device 20 in a case in which a possibility of the following vehicle colliding with the vehicle 10 has risen.

Third Exemplary Embodiment

Next, a description follows regarding a third exemplary embodiment of the vehicle 10 according to the present exemplary embodiments, with duplicate explanation of parts thereof common to other exemplary embodiments either abbreviated or omitted.

In the third exemplary embodiment a control section 21B determines that a notification condition is established when an approach state of a following vehicle toward the vehicle 10 is a specific state and also the vehicle speed of the vehicle 10 is a specific value or greater. The specific state is a state in which the following vehicle has approached as far as the specific region behind the vehicle 10 or is a state in which the TTC between the vehicle 10 and the following vehicle is a specific value or lower.

Figure 5:
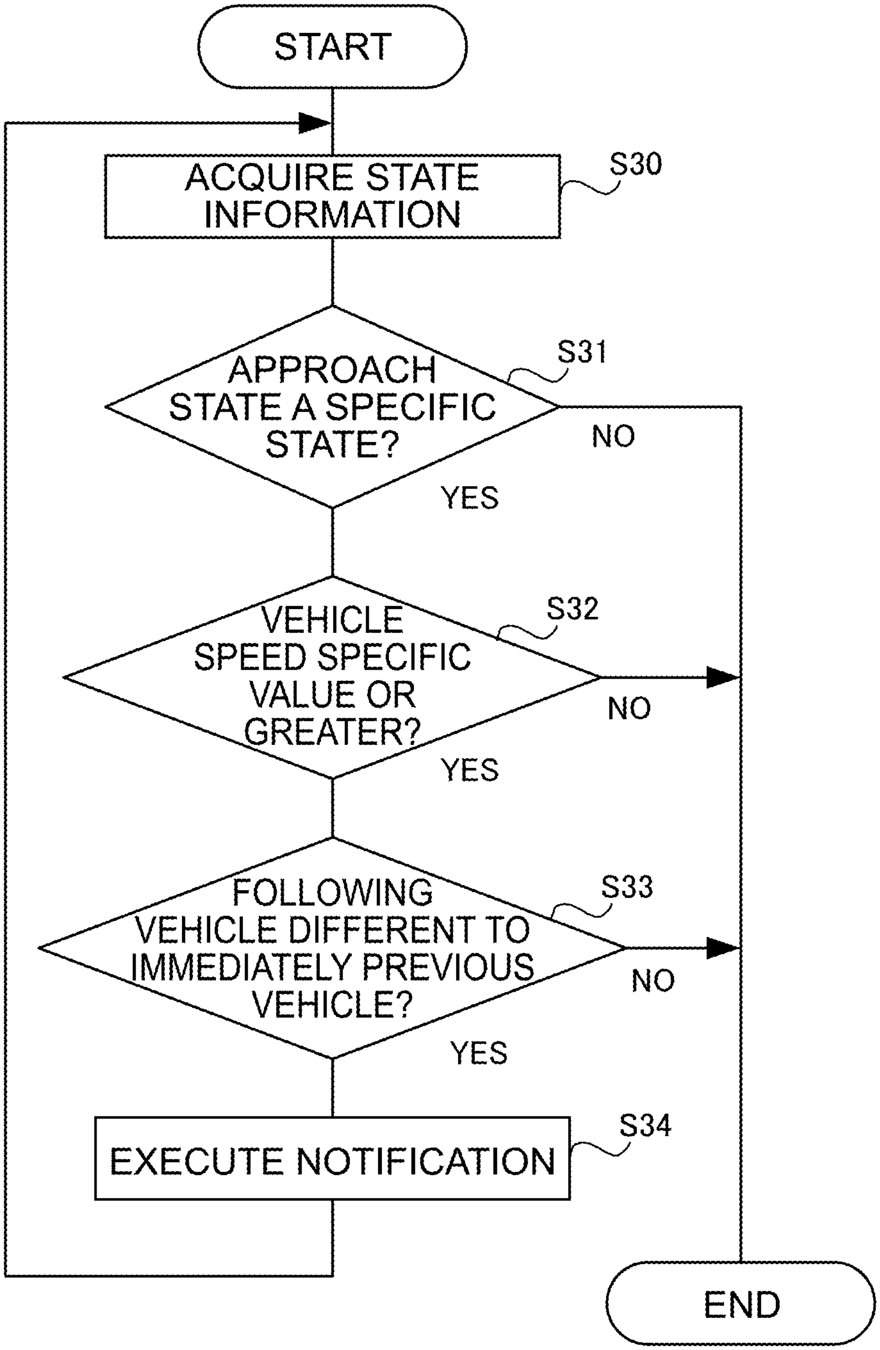
FIG. 5 is a third flowchart illustrating a flow of decision processing.

Next, description follows regarding a flow of decision processing in the third exemplary embodiment. FIG. 5 is a third flowchart illustrating a flow of decision processing.

At step S30 of FIG. 5, the CPU 21 acquires state information. The CPU 21 then proceeds to step S31.

At step S31, based on the state information acquired at step S30, the CPU 21 determines whether or not the approach state of the following vehicle toward the vehicle 10 is the specific state, and proceeds to step S32 in a case in which the specific state is determined (step S31: YES). However, the CPU 21 ends the decision processing in a case in which the approach state of the following vehicle toward the vehicle 10 is not determined to be the specific state (step S31: NO).

At step S32, the CPU 21 acquires the vehicle speed of the vehicle 10 from the vehicle speed sensor 40A, determines whether or not the acquired vehicle speed of the vehicle 10 is the specific value or greater, and proceeds to step S33 in a case in which determination is that it is the specific value or greater (step S32: YES). The CPU 21 ends the decision processing in a case in which the vehicle speed of the vehicle 10 is not determined to be the specific value or greater (step S32: NO).

At step S33, based on the state information acquired at step S30, the CPU 21 determines whether or not the following vehicle is different to the immediately previous vehicle, and proceeds to step S34 in a case in which the following vehicle is determined to be different to the immediately previous vehicle (step S33: YES). However, the CPU 21 ends the decision processing in a case in which the following vehicle is not determined to be different to the immediately previous vehicle (step S33: NO).

At step S34, the CPU 21 causes execution of notification by the monitor 41 and the speaker 42. The CPU 21 then returns to step S30.

As described above, in the control device 20 according to the third exemplary embodiment, the CPU 21 determines that the notification condition is established when an approach state of the following vehicle toward the vehicle 10 is a specific state and also the vehicle speed of the vehicle 10 is a specific value or greater. This thereby enables the control device 20 to prevent notification being executed on a road on which the vehicle speed of the vehicle 10 is less than the specific value, such as on an ordinary road, for example.

Often the vehicle speed of the vehicle 10 is the specific value or greater when at the same time the approach state of the following vehicle toward the vehicle 10 is the specific state. However, when a timing at which the approach state becomes the specific state and a timing at which the vehicle speed of the vehicle 10 becomes the specific value or greater happen in succession, the CPU 21 determines that the notification condition has been established at the timing described below.

More specifically, in a case in which the vehicle speed of the vehicle 10 has reached the specific value or greater after the approach state of the following vehicle toward the vehicle 10 becomes the specific state, the CPU 21 functions as the control section 21B and determines that the notification condition has been established at a timing the vehicle speed reached the specific value or greater. In such cases the CPU 21 causes execution of notification by the monitor 41 and the speaker 42 at the timing at which the notification condition was established as long as the following vehicle as identified is different to the immediately previous vehicle.

For cases in which the vehicle speed has then fallen to less than the specific value after the approach state of the following vehicle toward the vehicle 10 becomes the specific state and the vehicle speed of the vehicle 10 reached the specific value or greater, the CPU 21 functions as the control section 21B and determines that the notification condition is not established at a timing at which the vehicle speed falls below the specific value. In such cases, the CPU 21 halts notification from the monitor 41 and the speaker 42 at the timing at which the notification condition is no longer established.

Due to adopting the above configuration, in the control device 20 according to the third exemplary embodiment, establishment or non-establishment of the notification condition can be decided based on the approach state of the following vehicle toward the vehicle 10 and the vehicle speed of the vehicle 10.

Other Remarks

Although in the exemplary embodiment described above the following vehicle is detected using the millimeter radar sensor 40B, a detection device for detecting the following vehicle is not limited thereto. For example, the following vehicle may be detected using a camera and/or laser imaging detection and ranging (LIDAR) or the like either instead of, or in addition to, the millimeter radar sensor 40B. In a case in which a camera is employed as the detection device, the CPU 21 of the control device 20 captures images rearward of the vehicle 10 using the camera, and identifies the identity of the following vehicle based on information (for example: a number plate) contained in a previous and a subsequent captured image. In a case in which the road the vehicle 10 is traveling along is a dual-carriage way or wider, preferably the above detection device is employed to detect a lateral direction position of the following vehicle, and vehicles traveling in different lanes to that of the vehicle 10 are excluded from being subjected to the decision processing.

In the exemplary embodiment described above, the CPU 21 may perform the following control in cases while notification is being executed accompanying establishment of another notification condition (for example: a second notification condition) when there is no establishment history for establishment of a one-notification condition (for example: a first notification condition). In such cases the CPU 21 may make a notification state different to the notification performed based on when one of the notification conditions has been established (hereafter referred to as a "regular notification"). More specifically, as described above, the CPU 21 may lengthen an notification period to longer than that of the regular notification, change a display content of the monitor 41 from that of the regular notification, or change the output content of the speaker 42 from that of the regular notification.

In the exemplary embodiment described above, the monitor 41 serves as an example of a "notification section", however the "notification section" is not limited to being a display device. For example, another display device such as a head-up display (HUD), an electronic rearview mirror, or the like may be employed as an example of the "notification section". Moreover, there is no limitation to an example of the "notification section" being both the monitor 41 and the speaker 42, and one or other of the monitor 41 or the speaker 42 may serve as an example of the "notification section".

Note that the decision processing in the above exemplary embodiments executed by the CPU 61 reading software (a program) may be executed by various processors other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The decision processing may be executed by any one of these various types of processors, or may be executed by a combination of two or more of the same type or different types of processors (such as plural FPGAs, or a combination of a CPU and an FPGA). The hardware structure of these various types of processors is more specifically an electric circuit combining circuit elements such as semiconductor elements.

Moreover, although in the exemplary embodiments described above an embodiment was described in which the control program 24A is pre-stored (installed) in the storage section 24, there is no limitation thereto. The control program 24A may be provided in a format stored on a non-transitory storage medium such as a compact disk read only memory (CD-ROM), digital versatile disk read only memory (DVD-ROM), universal serial bus (USB) memory, or the like. The control program 24A may also be provided in a format downloadable from an external device over a network N.

The entire content of the disclosure of Japanese Patent Application No. 2022-164179 filed on Oct. 12, 2022 is incorporated by reference in the present specification. All publications, patent applications and technical standards mentioned in the present specification are incorporated by reference in the present specification to the same extent as if each individual publication, patent application, or technical standard was specifically and individually indicated to be incorporated by reference.

The invention claimed is:

1. A control device comprising a memory, and a processor coupled to the memory, wherein the processor is configured to:

acquire, as a detection result of a detection device capable of detecting a situation behind a host vehicle, state information related to an approach state toward a driver's vehicle of another vehicle approaching the driver's vehicle from behind and situation information regarding the situation behind the host vehicle;

based on the acquired state information, prohibit notification by a notification section, in a case in which a notification condition has been established for notifying an approach of the other vehicle toward the driver's vehicle to an occupant of the driver's vehicle through the notification section and the other vehicle is the same as a vehicle notified as approaching toward the driver's vehicle immediately previously;

detect a number of lanes of a road on which the host vehicle and the other vehicle are traveling, and a lateral position of the other vehicle on the road, based on the acquired situation information; and based on the detected number of lanes and the lateral position, exclude the other vehicle from notification by the notification unit in response to the other vehicle traveling in a different lane from the host vehicle.

2. The control device of claim 1, wherein:

the notification condition includes a first notification condition and a second notification condition; and the processor is configured to cause execution of notification by the notification section in a notification mode different from a normal notification mode executed in response to only one of the first notification condition or the second notification condition is satisfied, in a case in which, while executing notification accompanying establishment of one of the first notification condition or the second notification condition, the other of the first notification condition or the second notification condition for which there is no establishment history becomes established.

3. The control device of claim 2, wherein the processor is configured to:

determine that the first notification condition has been established in a case in which the other vehicle has approached as far as a specific region behind the driver's vehicle; and determine that the second notification condition has been established in a case in which a relative collision time resulting from dividing a distance between the driver's vehicle and the other vehicle by a relative speed between the driver's vehicle and the other vehicle is a specific value or lower.

4. The control device of claim 1, wherein:

the processor determines that the notification condition has been established in a case in which an approach state of the other vehicle toward the driver's vehicle is a specific state and also a vehicle speed of the driver's vehicle is a specific value or greater.

5. The control device of claim 4, wherein:

in a case in which the vehicle speed becomes the specific value or greater after the approach state of the other vehicle toward the driver's vehicle has become the specific state, the processor determines that the notification condition has been established at a timing when the vehicle speed has become the specific value or greater; and in a case in which the vehicle speed becomes less than the specific value after the approach state of the other vehicle toward the driver's vehicle is the specific state and the vehicle speed previously became the specific value or greater, the processor determines that the notification condition is not established at a timing at which the vehicle speed became less than the specific value.

6. The control device of claim 1, wherein the processor is further configured to determine whether the other vehicle is the same as the vehicle notified as approaching toward the driver's vehicle immediately previously based on processing of a movement track of the other vehicle.

7. The control device of claim 1, wherein the processor is further configured to based on the acquired state information, execute notification by the notification section, in a case in which the notification condition has been established for notifying the approach of the other vehicle toward the driver's vehicle through the notification section and the other vehicle is different from the vehicle notified as approaching toward the driver's vehicle immediately previously.

8. The control device of claim 7, wherein the notification section comprises at least one of a speaker or a monitor.

9. A control method, comprising, by a processor:

acquiring, as a detection result of a detection device capable of detecting a situation behind a host vehicle, state information related to an approach state toward a driver's vehicle of another vehicle approaching the driver's vehicle from behind and situation information regarding the situation behind the host vehicle;

based on the acquired state information, prohibiting notification by a notification section, in a case in which a notification condition has been established for notifying an approach of the other vehicle toward the driver's vehicle to an occupant of the driver's vehicle through the notification section and the other vehicle is the same as a vehicle notified as approaching toward the driver's vehicle immediately previously;

detecting a number of lanes of a road on which the host vehicle and the other vehicle are traveling, and a lateral position of the other vehicle on the road, based on the acquired situation information; and based on the detected number of lanes and the lateral position, excluding the other vehicle from notification by the notification unit in response to the other vehicle traveling in a different lane from the host vehicle.

10. The control method of claim 9, further comprising determining whether the other vehicle is the same as the vehicle notified as approaching toward the driver's vehicle immediately previously based on processing of a movement track of the other vehicle.

11. The control method of claim 9, further comprising based on the acquired state information, executing notification by the notification section, in a case in which the notification condition has been established for notifying the approach of the other vehicle toward the driver's vehicle through the notification section and the other vehicle is different from the vehicle notified as approaching toward the driver's vehicle immediately previously.

12. The control device of claim 11, wherein the notification section comprises at least one of a speaker or a monitor.

13. A non-transitory storage medium storing a program executable by a processor to perform processing, the processing comprising:

acquiring, as a detection result of a detection device capable of detecting a situation behind a host vehicle, state information related to an approach state toward a driver's vehicle of another vehicle approaching the driver's vehicle from behind and situation information regarding the situation behind the host vehicle;

based on the acquired state information, prohibiting notification by a notification section, in a case in which a notification condition has been established for notifying an approach of the other vehicle toward the driver's vehicle to an occupant of the driver's vehicle through the notification section and the other vehicle is the same as a vehicle notified as approaching toward the driver's vehicle immediately previously;

detecting a number of lanes of a road on which the host vehicle and the other vehicle are traveling, and a lateral position of the other vehicle on the road, based on the acquired situation information; and based on the detected number of lanes and the lateral position, excluding the other vehicle from notification by the notification unit in response to the other vehicle traveling in a different lane from the host vehicle.

14. The non-transitory storage medium of claim 13, wherein the processing further comprises determining whether the other vehicle is the same as the vehicle notified as approaching toward the driver's vehicle immediately previously based on processing of a movement track of the other vehicle.

15. The non-transitory storage medium of claim 13, wherein the processing further comprises based on the acquired state information, executing notification by the notification section, in a case in which the notification condition has been established for notifying the approach of the other vehicle toward the driver's vehicle through the notification section and the other vehicle is different from the vehicle notified as approaching toward the driver's vehicle immediately previously.

16. The non-transitory storage medium of claim 15, wherein the notification section comprises at least one of a speaker or a monitor.

* * * * *